United States Patent
Whitefoot et al.

(10) Patent No.: US 7,165,733 B2
(45) Date of Patent: Jan. 23, 2007

(54) SANITARY SPRAY NOZZLE

(75) Inventors: Allan D. Whitefoot, University Place, WA (US); Richard E. Magoon, Tacoma, WA (US)

(73) Assignee: Karin M. Bolland, Tacoma, WA (US)

(*) Notice: Subject to any disclaimer, the term of this patent is extended or adjusted under 35 U.S.C. 154(b) by 179 days.

(21) Appl. No.: 10/928,905

(22) Filed: Aug. 27, 2004

(65) Prior Publication Data

US 2005/0082384 A1    Apr. 21, 2005

Related U.S. Application Data

(60) Provisional application No. 60/499,684, filed on Sep. 2, 2003.

(51) Int. Cl.
*B05B 7/12* (2006.01)

(52) U.S. Cl. ............ 239/408; 239/270; 239/407; 239/410; 239/411; 239/438; 239/443; 239/570; 239/583

(58) Field of Classification Search ............ 239/8, 239/63, 124, 127, 270, 318, 398, 407, 408, 239/410, 411, 418, 420, 436, 438, 443, 569–573, 239/583
See application file for complete search history.

(56) References Cited

U.S. PATENT DOCUMENTS

| | | | |
|---|---|---|---|
| 3,066,874 A * | 12/1962 | Becker | 239/411 |
| 3,190,501 A * | 6/1965 | Lambert | 239/411 |
| 3,923,252 A * | 12/1975 | Warning et al. | 239/411 |
| 4,193,373 A | 3/1980 | Hanson, Jr. et al. | |
| 4,216,907 A * | 8/1980 | Fuller | 239/127 |
| 4,283,012 A | 8/1981 | Hanson | |
| 4,462,543 A * | 7/1984 | Yam | 239/8 |
| 4,565,217 A * | 1/1986 | McIntyre | 137/625.5 |
| 4,631,837 A | 12/1986 | Magoon | |
| 4,907,741 A * | 3/1990 | McIntyre | 239/124 |
| 5,603,257 A | 2/1997 | Kateman et al. | |
| 5,782,410 A * | 7/1998 | Weston | 239/63 |
| 6,047,484 A | 4/2000 | Bolland et al. | |
| 6,267,302 B1 | 7/2001 | Huffman | |
| 6,520,426 B1 | 2/2003 | Huffman | |
| 6,601,603 B1 * | 8/2003 | Griffin | 137/240 |

* cited by examiner

*Primary Examiner*—Kevin Shaver
*Assistant Examiner*—Jason Boeckmann
(74) *Attorney, Agent, or Firm*—R. Reams Goodloe, Jr.

(57) ABSTRACT

A sanitary spray nozzle system. The nozzle may be fixed in position, or may be mounted on an oscillating or moveable carriage for application of material to a thin film dryer. A nozzle body includes a hollow mounting chamber with an inner surface, a product supply portion, and a discharge portion with a discharge orifice. A spray nozzle assembly is removably mounted to the hollow mounting chamber. The assembly has a propellant supply tube having an outer surface, a discharge end for discharge of propellant fluid, an outer seal sealable against the inner surface of the mounting chamber, and an inner seal slidably engageable with the outer surface of the propellant supply tube, in a fluid tight manner. An actuator urges the discharge end of the spray nozzle between an end stop position wherein the discharge end is adjacent the discharge orifice, and a wide open position wherein the discharge end is spaced apart from the discharge orifice.

36 Claims, 9 Drawing Sheets

SANITARY SPRAY NOZZLE

RELATED PATENT APPLICATIONS

This patent application claims priority from prior U.S. Provisional Patent Application Ser. No. 60/499,684 filed on Sep. 2, 2003, entitled SANITARY SPRAY NOZZLE, the disclosure of which is incorporated herein in its entirety by this reference.

COPYRIGHT RIGHTS IN THE DRAWING

A portion of the disclosure of this patent document contains material that is subject to copyright protection. The applicant no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to apparatus for spraying of materials, especially as may be employed as a part of drying operations. Such apparatus is particularly well suited to sanitary applications, such as processing and packaging of foods.

BACKGROUND

Methods and apparatus for the transfer of heat through a thin, infrared transparent film between a flowable product such as sludge, slurry, extract, juice, or other like product, and a heated or chilled liquid, been taught in our previous patents, namely U.S. Pat. No. 4,631,837, issued Dec. 30, 1986 for a Method and Apparatus for Drying Fruit Pulp and the Like, and U.S. Pat. No. 6,047,484, issued Apr. 11, 2000, for a Method and Apparatus for Evaporating Liquid from a Product, and the disclosures of each of these U.S. patents is incorporated herein in their entirety by this reference. However, the challenge of uniformly distributing a material on such a thin film has continued to require development of new apparatus and methods, especially to take advantage of such apparatus as applied to food preparation. And concurrently, the need for sanitary systems that can be easily cleaned to a high level of purity, i.e., freedom from biological contamination, has continued to be of utmost importance to food processors. Thus, the ability to provide apparatus and systems for sanitary, cleanable application of foods to dryers and evaporators has become increasingly important. This is especially true at locations which are making foods such as fruit leathers from a pulp or fruit juice mass, which, after drying, must remain viable for long storage periods. Also, in order to pass governmental inspections in most, if not all locales, easily cleaned sanitary equipment is mandatory. Thus, there has been an increasing demand for high performance drying and evaporation systems, including for designs such as those taught in the prior art patents that were just noted above, but that demand has been coupled with a requirement to provide therewith a cleanable, sanitary spray nozzle for application of materials to the thin film used in the drying apparatus. Consequently, this disclosure provides novel and improved spray nozzles, and apparatus for using such improved nozzles in drying equipment to provide relatively uniform, easily dried product layers to such thin film evaporation equipment.

BRIEF DESCRIPTION OF THE DRAWING

In order to enable the reader to attain a more complete appreciation of the invention, and of the novel features and the advantages thereof, attention is directed to the following detailed description when considered in connection with the accompanying figures of the drawing, wherein.

Figure 5:
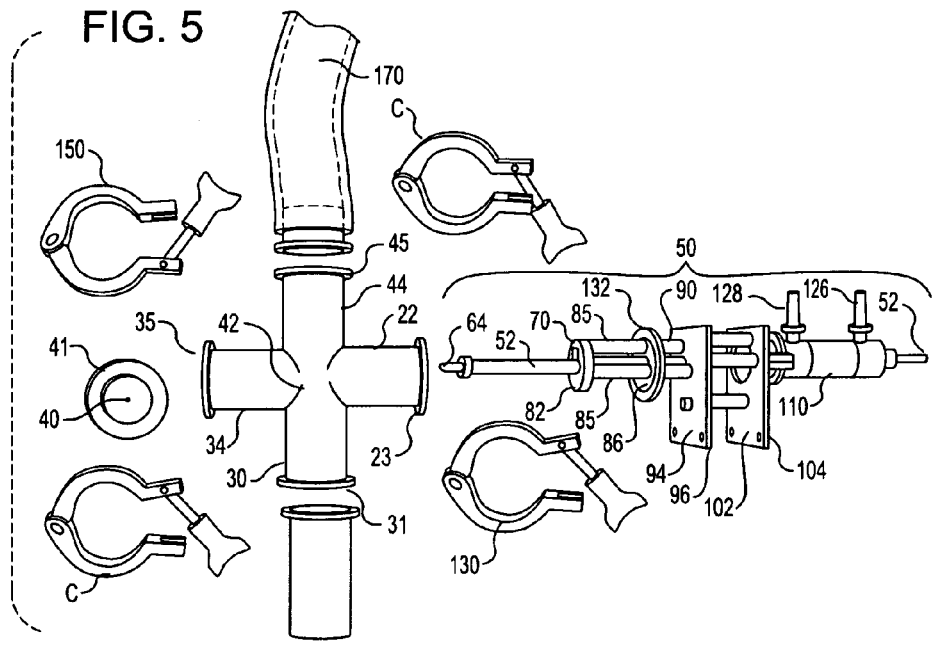
FIGS. 5 and 6 show one typical configuration for sanitary connections, where a thin white or clear sanitary gasket is used at each clamp location.

First, FIG. 5 provides a perspective view showing the obverse side of the back mounting plates, and thus, the obverse side of the sanitary gasket used in connecting the spray nozzle assembly to the hollow nozzle mounting chamber.

Figure 6:
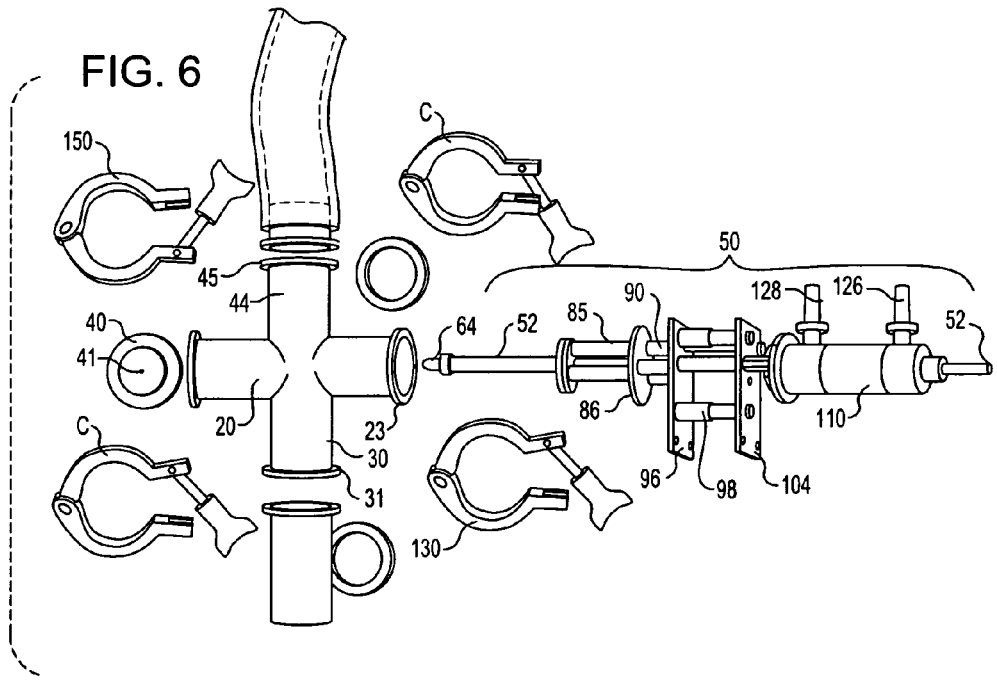

Next, FIG. 6 provides a perspective view showing the reverse side of the first and second back mounting plates, as well as a second set of external spacers used to space the actuator from the second back mounting plate.

Figure 7:
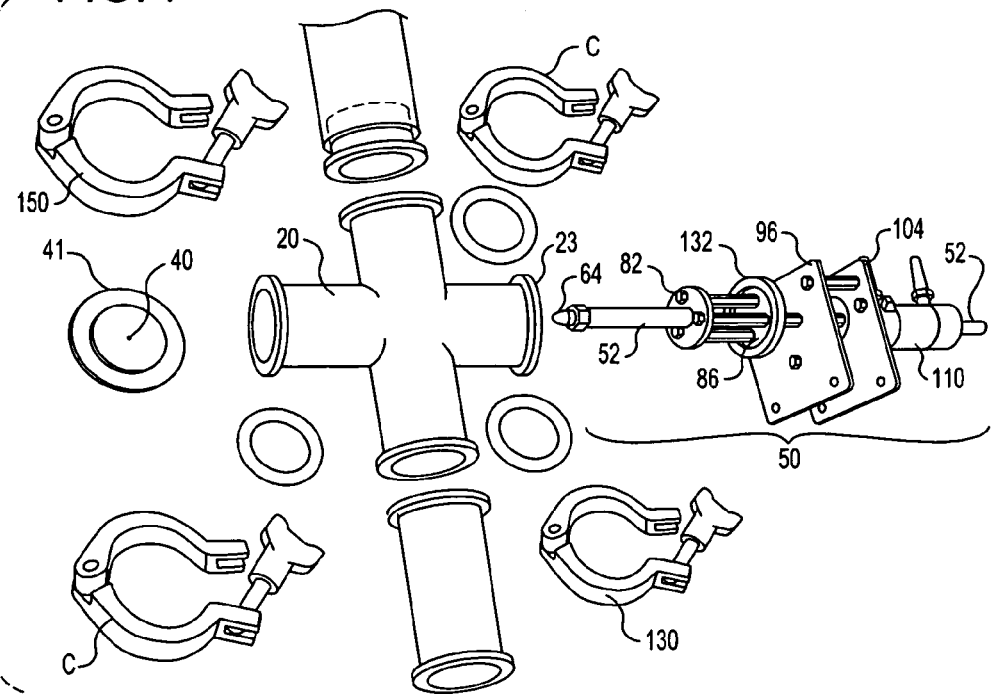
Figure 8:
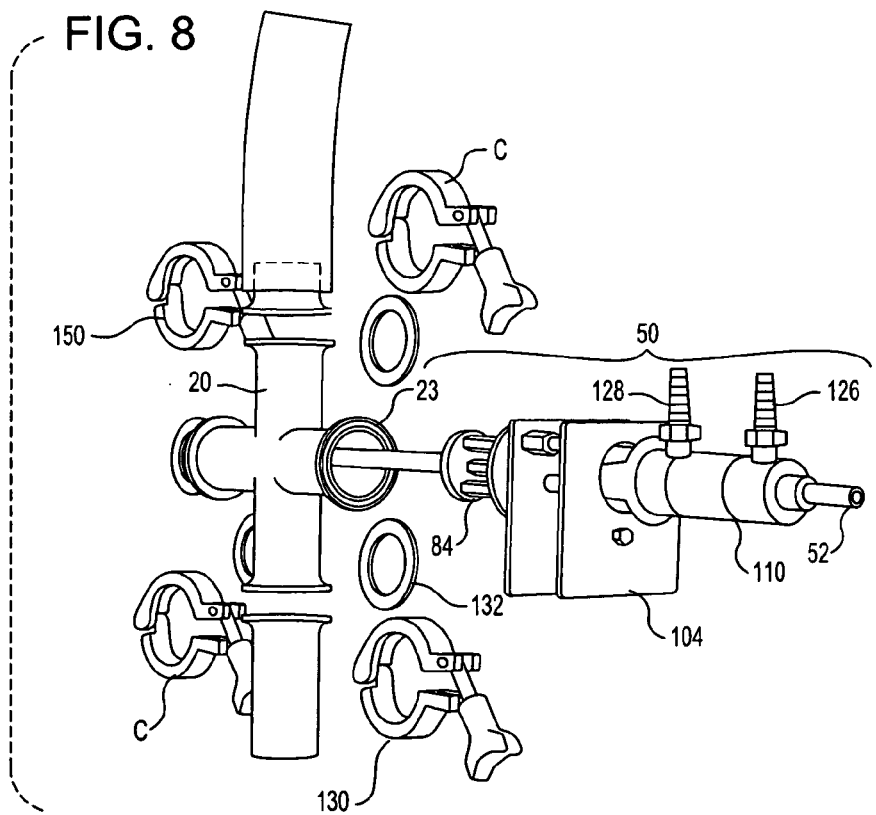
Figure 9:
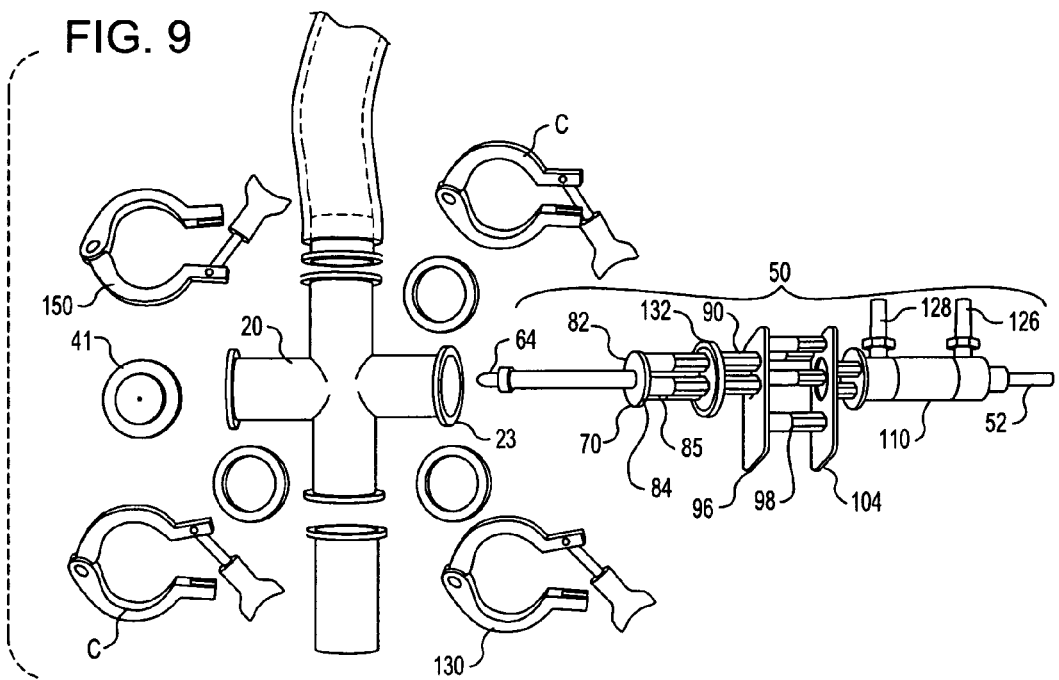

FIGS. 7, 8, and 9 show how the spray nozzle assembly is secured to the spray nozzle body by use of quick disconnect clamps.

FIG. 7 provides a perspective view of the obverse side of the first and second back mounting plates, as well as a view of the propellant tube and discharge nozzle.

Next, FIG. 8 provides a perspective view of the reverse side of the first and second back mounting plates, and shows the actuator affixed to the second back mounting plate.

FIG. 9 is a perspective view of the embodiment similar to that just shown in FIG. 7, but providing a better perspective view of the discharge nozzle affixed to the propellant tube, and a better perspective view of the relationship of the linear actuator to the second back mounting plate.

Figure 10:
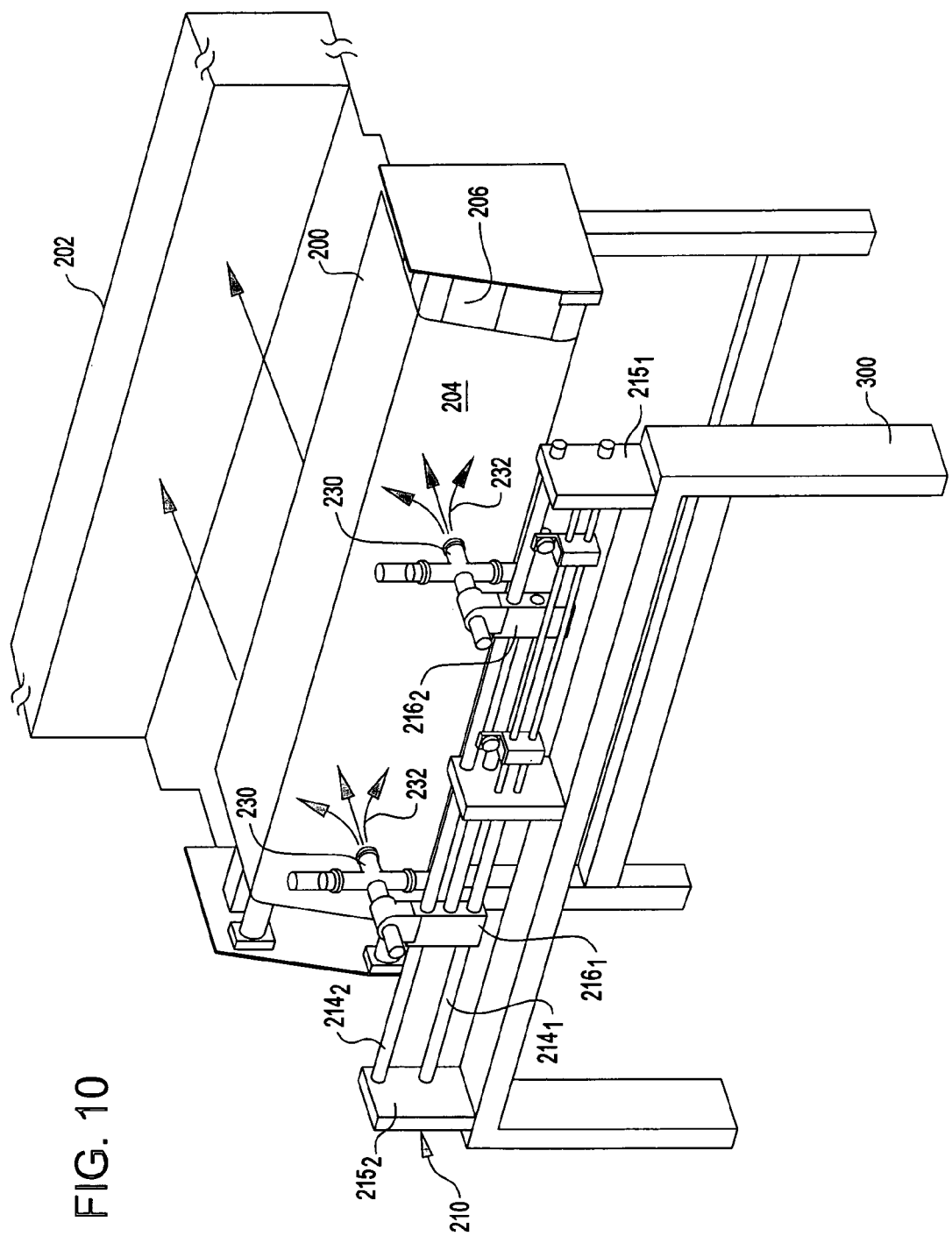

FIG. 10 is a perspective view of a spray nozzle system using a pair of spray nozzles moving in an oscillating fashion to uniformly apply a product to an endless thin film in a dryer.

Figure 11:
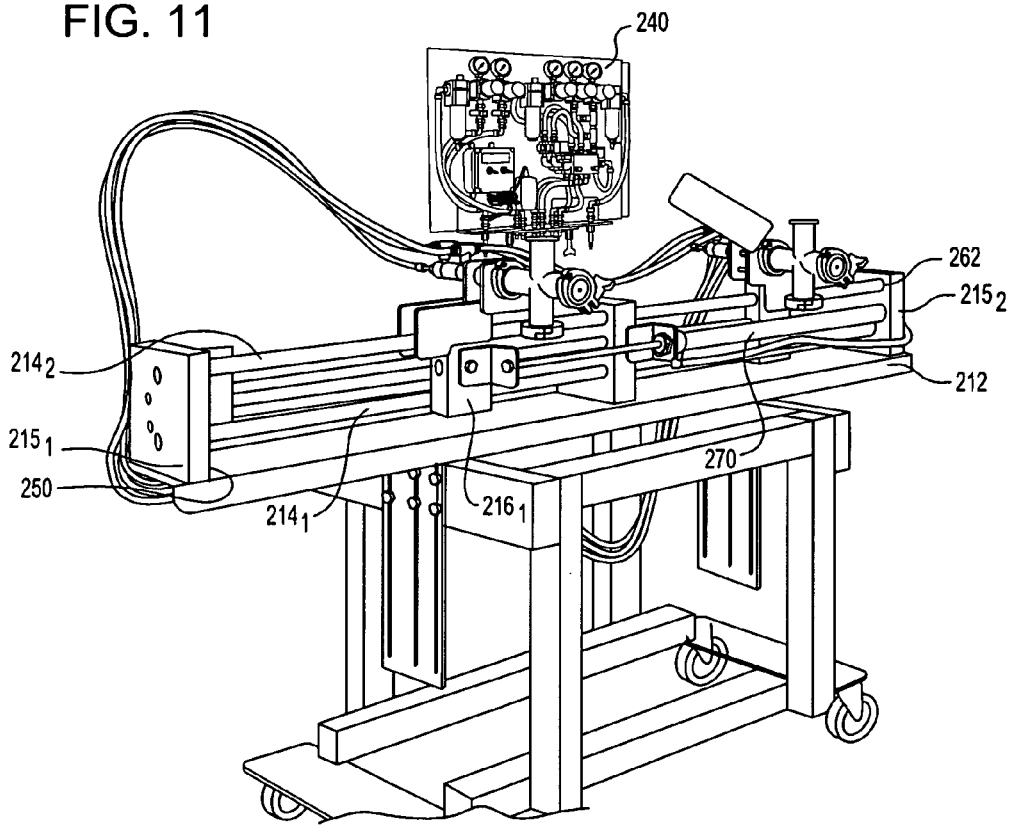

FIG. 11 is a perspective view of an oscillating applicator assembly, shown removed from a dryer for cleaning and inspection, wherein the actuator assembly for moving the first and second spray nozzles back and forth is clearly shown.

Figure 12:
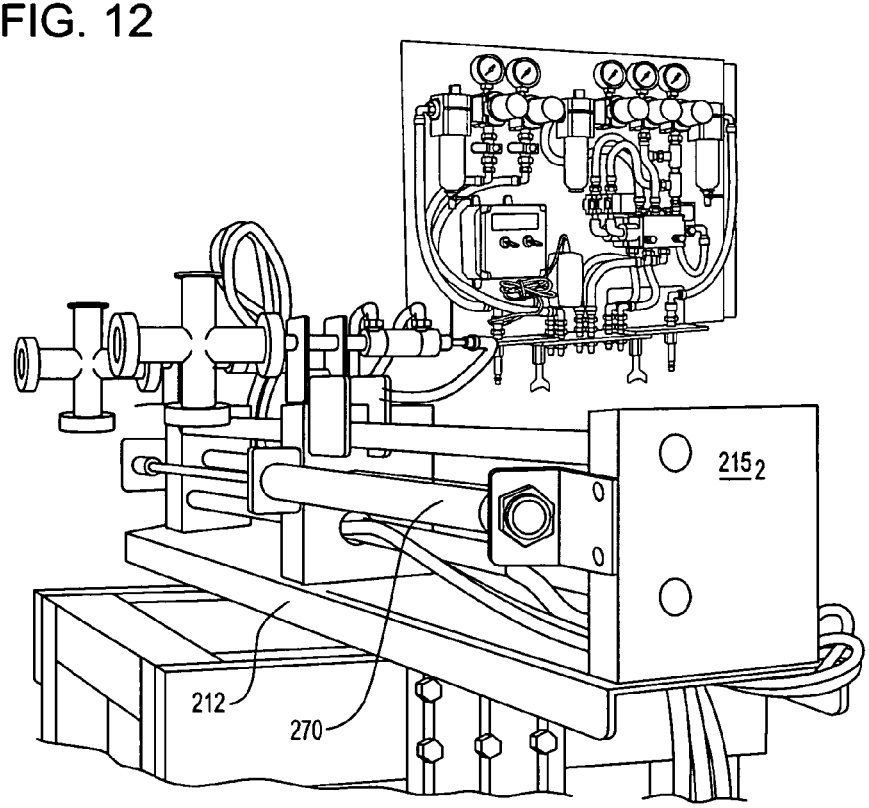

FIG. 12 is also a perspective view of an oscillating applicator assembly, shown removed from a dryer for cleaning and inspection, now showing an end block to which a pair of slide rails are affixed, and to which one end of an actuator is affixed to impart oscillating motion to each one of the spray nozzles.

Figure 13:
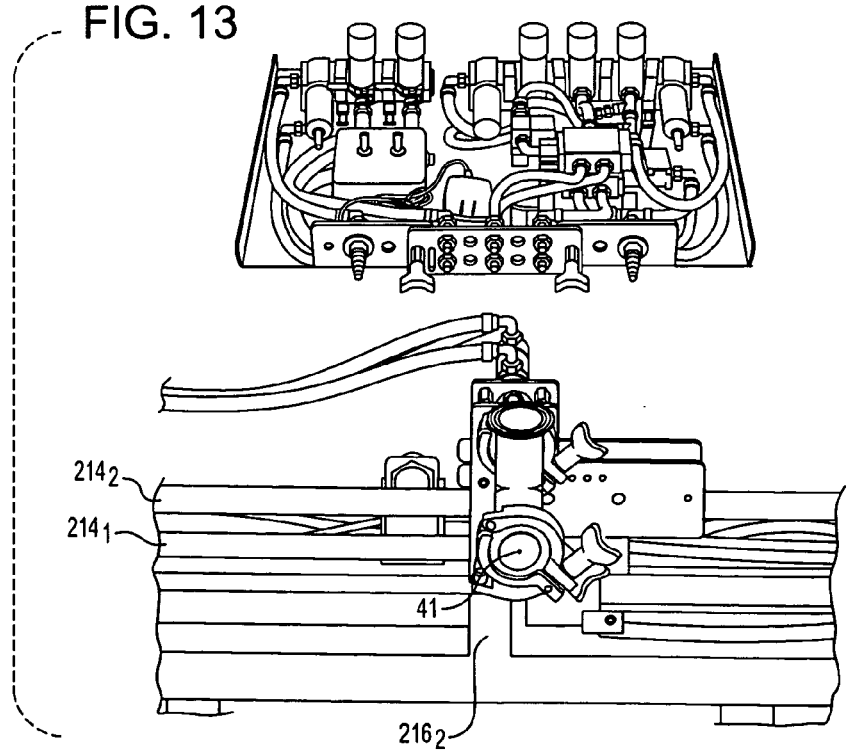

FIG. 13 is a close perspective view of a discharge orifice on a spray nozzle, as well as showing that the nozzle is mounted to a slide block on the spray system.

Figure 14:
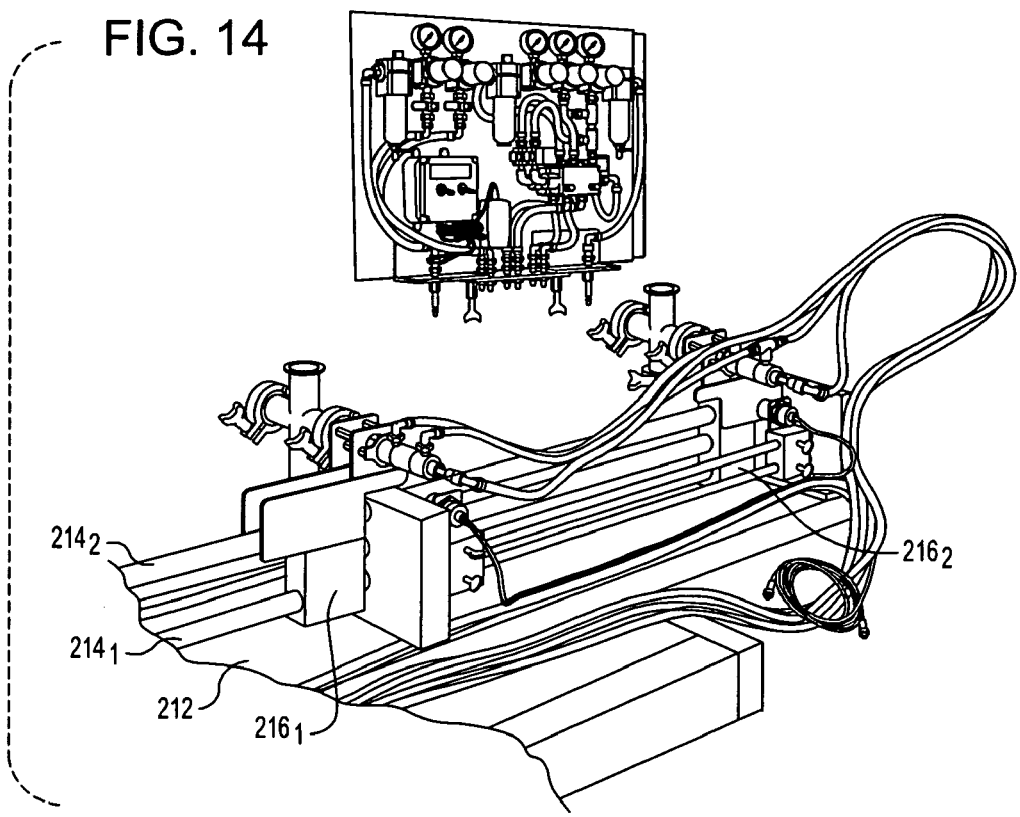

FIG. 14 is a perspective view of a pair of spray nozzles mounted for oscillation on a spray system carriage., showing the two slide blocks, each of which has one spray nozzle affixed thereto.

Figure 15:
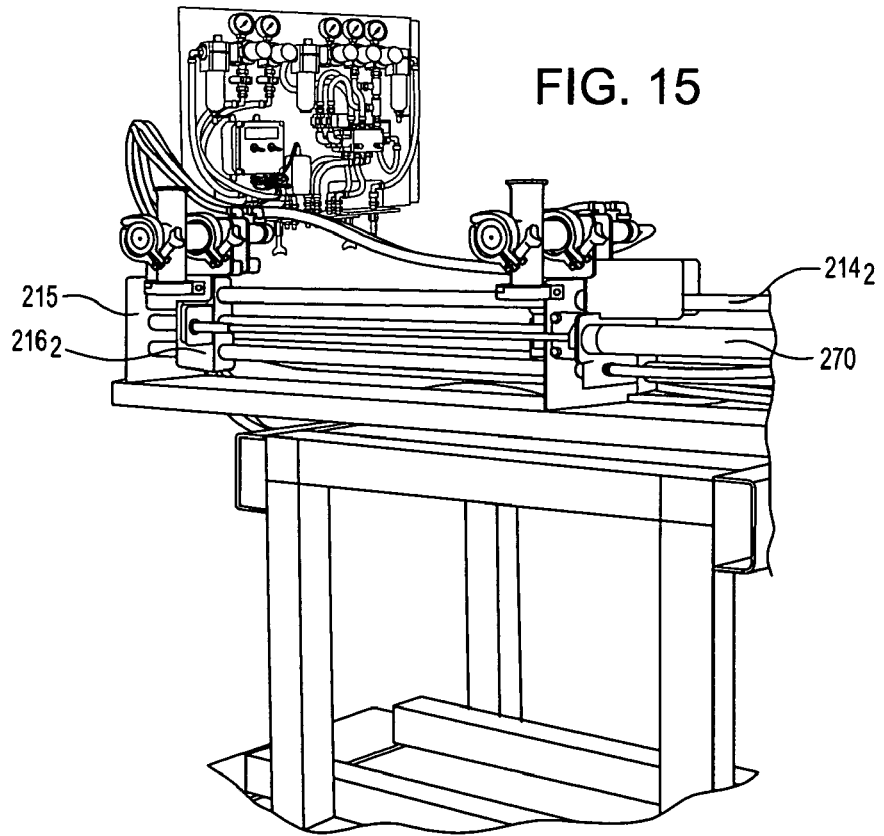

FIG. 15 is a perspective view of the working side, i.e., discharge orifice side of each of the spray nozzles mounted on a spray system carriage.

Figure 16:
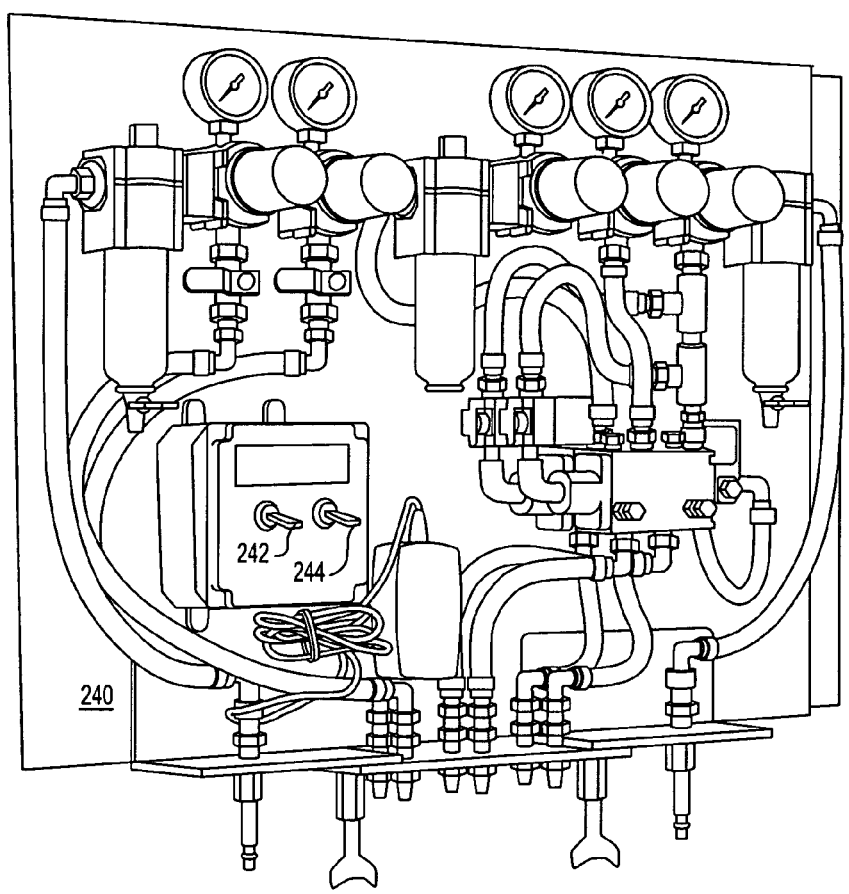

FIG. 16 is a perspective view of one embodiment of a control panel adapted for controlling the oscillating frequency (sweep frequency) as well as the discharge of product through the spray nozzles located on a spray system carriage such as just illustrated in FIGS. 10 through 15 above.

The foregoing figures, being merely exemplary, contain various elements that may be present or omitted from actual implementations and process configurations of the spray apparatus taught herein, depending upon the circumstances. An attempt has been made to draw the figures in a way that illustrates at least those elements that are significant for an understanding of the various embodiments and aspects of the invention. However, various other elements of unique sanitary spray nozzles are also shown and briefly described to enable the reader to understand how various features, including optional or alternate features, may be utilized in order to provide a simple, cleanable, sanitary spray apparatus that can be manufactured in a desired size and configuration for providing a long lasting and superbly performing spray system.

DETAILED DESCRIPTION

The improvements described and claimed herein relate to methods and apparatus for providing sanitary spray nozzles for products, and in particular for the use of such spray nozzles for the spray application of products to thin film evaporation and drying equipment. More specifically, the improvement described herein is to provide a unique cleanable spray nozzle for use in sanitary, cleanable service, and to the application of such nozzles in an efficient, oscillating spray applicator for use in thin film evaporation and drying equipment.

Figure 1:
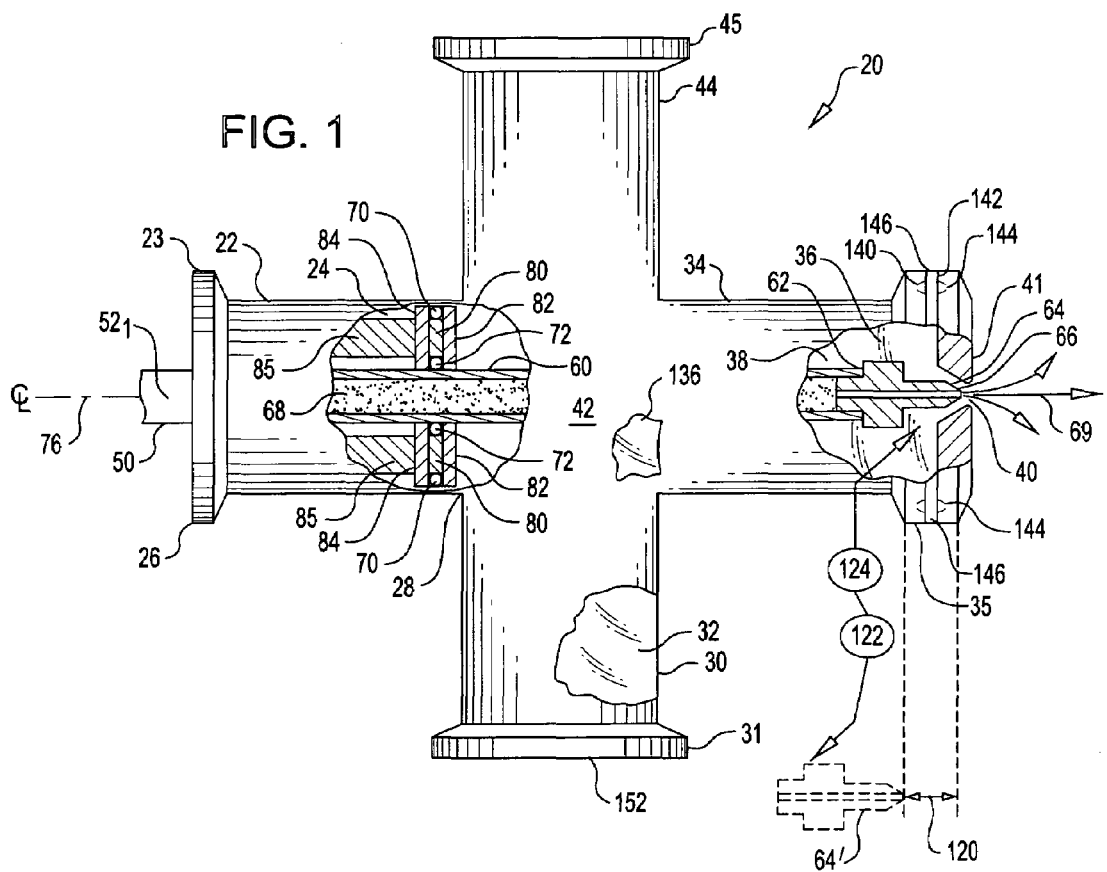
FIG. 1 provides a partially broken away view of one embodiment of the body of our novel spray nozzle, showing in vertical cross-section view certain portions of the spray nozzle assembly and of the discharge orifice, as well as the product inlet and overflow tubes.

Referring now to FIG. 1, certain internal elements of one embodiment of a spray nozzle is depicted. A cleanable, sanitary body 20 is provided in a suitable material such as polished stainless steel. The body 20 has a hollow nozzle mounting chamber 22 having an inner surface 24. The hollow nozzle mounting chamber 22 has a nozzle mounting end 26 and a product receiving end 28. The body 20 also has a product supply portion 30. The product supply portion 30 has an internal product passageway defined by interior walls 32. The body 20 includes a discharge portion 34. The discharge portion 34 includes discharge interior walls 36 defining a product discharge passageway 38, and a discharge orifice 40 in discharge orifice plate 41. An intersection housing portion 42 is provided to connect in a fluid tight relationship the various legs 22, 30, and 34 (i.e., hollow nozzle mounting chamber 22, product supply portion 30, and discharge portion 34, respectively), as well as a product overflow portion 44 as depicted in the embodiment illustrated in FIG. 1. Also, as depicted in FIG. 1, the four legs 22, 30, 34, and 44 as the intersection housing 42 may be provided in a integral, one-piece, generally cross or "+" shaped configuration. Additionally, as noted, each of legs 22, 30, 34, and 44 may include flanges 23, 31, 35, and 45, respectively, which flanges are particularly useful for construction of quickly disassembled, cleanable sanitary nozzle body 20.

A spray nozzle assembly 50, more easily seen in FIGS. 5 and 6, is removably mounted to the hollow nozzle mounting chamber 22. The spray nozzle assembly includes a propellant supply tube 52. The propellant 54 normally used for most applications is compressed air from a compressed air source 56 (see FIG. 2), but the apparatus is suitable for use with other fluids as the propellant 54. The propellant supply tube 52 has an outer surface 60 (see FIG. 1). A discharge end 62 of the propellant supply tube 52 includes a discharge nozzle 64 (which may be removable as depicted in FIG. 1), having a discharge nose 66 sized and shaped for discharge of a propellant fluid 68 through said discharge nozzle 64 and thence through discharge orifice 40 of discharge orifice plate 41 while entraining product therewith to produce a product/propellant discharge stream 69.

As best seen in FIG. 1, a first, outer seal 70 is provided, dimensioned relative to the inner surface 24 of the hollow nozzle mounting chamber 22 so as to be engageable in a fluid tight manner with the inner surface 24. A second, inner seal 72 is dimensioned relative to the outer surface 60 of the propellant supply tube 52 so as to be slidably engageable in a fluid tight manner with the outer surface 60, as, in one embodiment, the propellant supply tube 60 moves toward and away from the discharge orifice 40 along a central axis 76. A seal mount 80 is provided, extending between the first, outer seal 70 and the second, inner seal 72, so as to effectively seal the nozzle mounting end 26 of the hollow nozzle mounting chamber 22 from the product receiving end 28 of the hollow nozzle mounting chamber 22. Further, as depicted in FIGS, 1, 5, and 6, in one embodiment, for structural purposes in providing a spray nozzle assembly 50, it has been found useful to provide a forward blocking disc 82 and a rearward blocking disc 84 to assist in caging outer seal 70 and inner seal 72, as well as to provide for connection of seal mount 80 to inner structural spacers 85 which extend outward to mounting flange 86. As shown in the embodiment depicted in FIG. 1, the outer seal 70 and the inner seal 72 are provided as O-rings, but other seal types may be utilized as convenient. Also as shown in the embodiment depicted in FIG. 1, the forward blocking disc 82 and the rearward blocking disc 84 are provided in the form of an annulus which fits slidingly between inner wall 24 and outer surface 60. Thus, as illustrated in this embodiment, for convenience, but not necessarily limited thereto, the hollow nozzle mounting chamber 22 is cylindrical. In such a case, as depicted, the seal mount 80 is annular in shape.

Further, as shown in FIG. 1, inner structural spacers 85 may be provided in any convenient cleanable material such as structural rods. Also, in the embodiment shown in FIGS. 2, 5, and 6, a first set of exterior structural spacers 90 is provided between the reverse side 92 of mounting flange 86 and the obverse side 94 of the first one 96 of at least one back mounting plates. Then a second set of exterior structural spacers 98 is provided between reverse side 100 of the first back mounting plate 96 and the obverse side 102 of a second one 104 of at least one back mounting plates. Each one of the first set 90 and the second set 98 of exterior structural spacers may be provided in a convenient cleanable material, such as structural rods.

Figure 2:
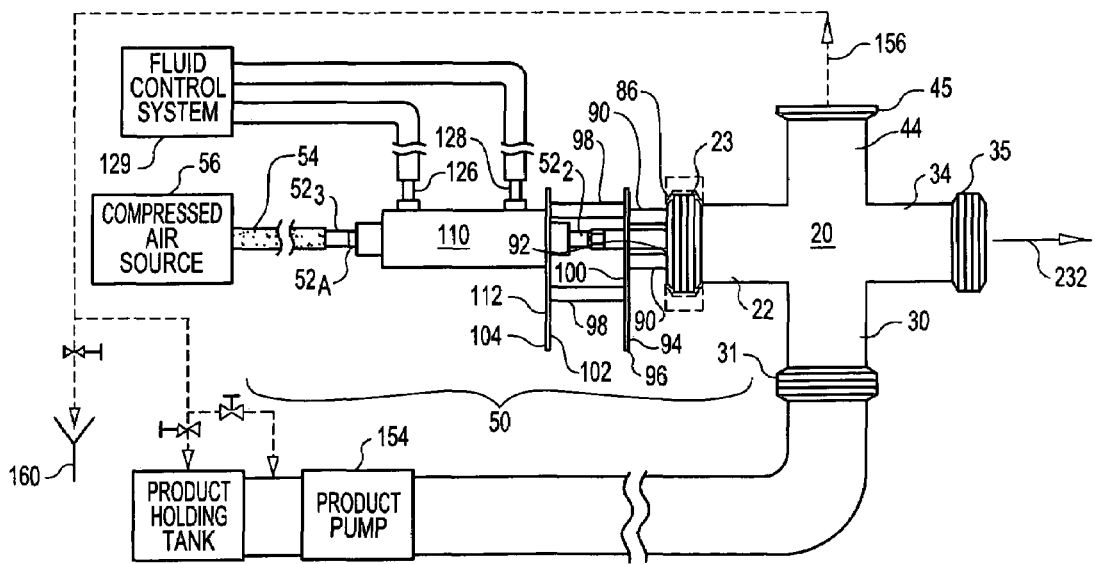
FIG. 2 provides a schematic view of our novel spray nozzle assembly, shown in working configuration with a product holding tank, a product pump to deliver product to the spray nozzle body, and spray nozzle assembly including the linear actuator, as well as a fluid control system for the linear actuator and a propellant source such as compressed air for use in the spray nozzle.

An actuator 110 is provided, which as shown in the embodiment depicted in FIGS. 2, 5, and 6, may be affixed to the reverse side 112 of the second back mounting plate 104. The actuator 110 is operatively connected to move or to urge the discharge end 62 of propellant tube 52 and discharge nozzle 64 to, and between, a first, end stop position as shown in FIG. 1, wherein the discharge nose end 66 is adjacent the discharge orifice 40, and a second, wide open position as illustrated in phantom lines, schematically in FIG. 1, where discharge nozzle 64' is shown with the discharge nose end 66 spaced apart a preselected distance 120 from the discharge orifice plate 41. Although the phantom lines for discharge nozzle 64' are shown below in FIG. 1 for clarity of illustration, it is to be understood that discharge nozzle 64 moves along a central axis of centerline 76 the open 122 and closed 124 positions. First 126 and second 128 nozzles on actuator 110 are adapted for receiving fluid from a fluid control system 129, which, as depicted, may be provided in the form of a double acting fluid actuator, such as an air actuated cylinder. As depicted, we have found it convenient to provide a propellant supply tube 52 which extends concentrically through the fluid actuated cylinder 110, and wherein the propellant supply tube 52 is sized, shaped, and affixed with the spray nozzle assembly 52 to allow movement relative to both the hollow nozzle mounting chamber 22 and the fluid actuated cylinder 110. Note that propellant supply tube 52 may be made up of fluid tight joined segments $52_1$, $52_2$, $52_3$, etc., as necessary for assembly and for use of a tube segment $52_A$ which is within and concentric to the actuator 110. Further, the distance 120 of the discharge nozzle 64 from the discharge orifice plate 41 is adjustably selected during operation of the spray nozzle for service for any suitable substance, for example, (a) a liquid, or (b) a slurry, (c) pumpable high viscosity material, or (d) any substance or product material where particulates are included in (i) a liquid, (ii) a slurry, or (iii) a pumpable high viscosity material. Commonly sprayed materials include foods such as fruit or berry mixtures, such as raspberry puree, which are to be dried.

Figure 3:
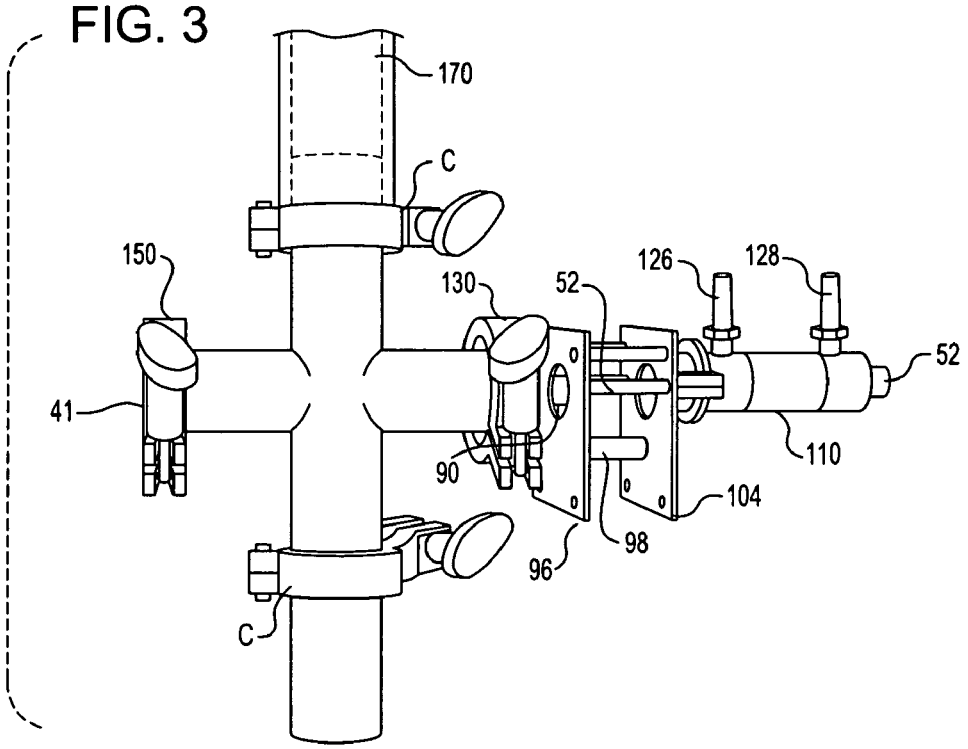
FIG. 3 provides a photograph of an assembled spray nozzle, including the body, and the spray nozzle assembly mounted thereto via use of quick disconnect sanitary clamps; use of a Bimba® brand (or equivalent) air actuator cylinder mounted to, but spaced apart from the body, provides for movement of the spray nozzle propellant supply tube therethrough.
Figure 4:
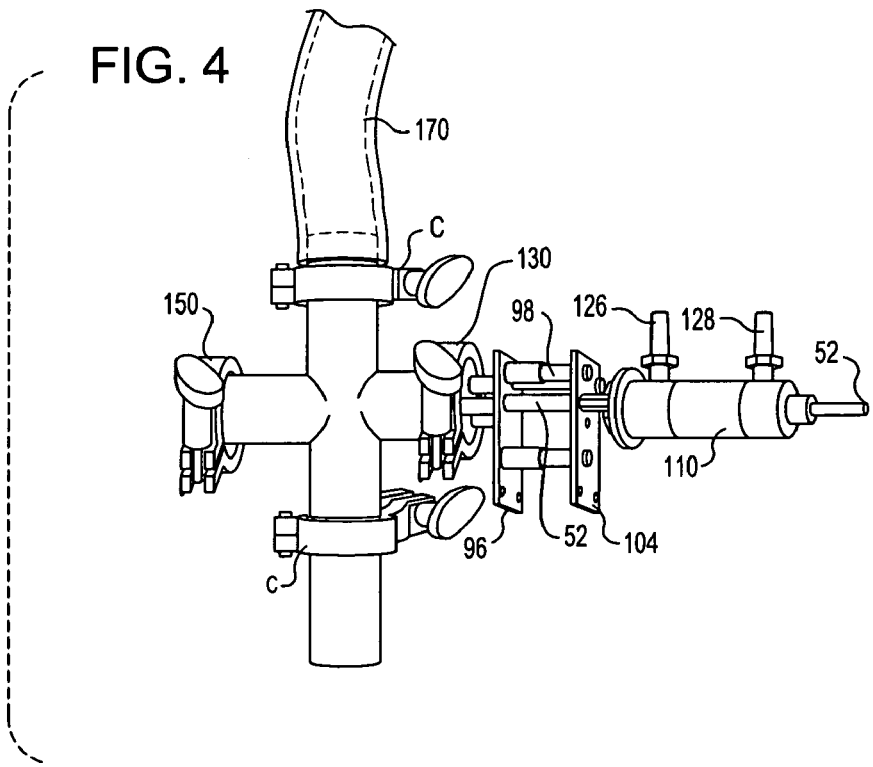
FIG. 4 is similar to, and shows most of the same details as the view just provided in FIG. 3, however, now showing the apparatus from a slightly different, more rearward perspective, to more clearly show the reverse side of the back mounting plates, the rearmost of which is affixed to the actuator.

To affix the spray nozzle assembly 52 to the body 20, as shown in FIGS. 2, 3, and 4, the spray nozzle assembly may be detachably joined with the inlet flange 23 of the hollow nozzle mounting chamber 22 with a quick disconnect clamp 130. As depicted in FIG. 2, and seen in FIGS. 7 and 9, a sanitary seal 132 is normally used between inlet flange 23 and mounting flange 86, and the clamp 130 secures the inlet flange 23, seal 132, and mounting flange 86 together in secure mating engagement.

As mentioned above, it is useful in sanitary service that the interior walls 32 of the product supply portion, as well as the interior walls 136 of the intersecting housing 42, have smooth, cleanable surfaces. Also, it is useful in sanitary service that the walls 36 of the discharge product passageway 38 have smooth, cleanable surfaces. Likewise, it is also useful in sanitary service that at least that portion of the inner surface 24 of the hollow nozzle mounting chamber 22 located to the product receiving end side 28 of the first, outer seal 70 have a smooth, cleanable surface. Likewise, it is useful that at least that portion of the inner surface 24 of the hollow nozzle mounting chamber 22 located in complementary engagement with the first, outer seal 70 have a smooth cleanable surface.

As seen in FIG. 1, the discharge end 34 has a discharge flange 35 having a seal engaging recess ring 140 (shown in broken lines). The discharge orifice plate 41 has an interior face 142 having a seal engaging recess ring 144. The discharge flange 35 and the interior face 142 of the discharge orifice plate 41 are configured for mating engagement while incorporating a sanitary seal 146 fitted therebetween. As shown in FIGS. 3 and 4, the discharge orifice plate 41 is detachably joined with the discharge flange 35 with a quick disconnect clamp 150.

As shown in FIG. 1, the product supply portion 30 includes at least one inlet 152 in fluid communication with the discharge portion 34 As indicated in FIG. 2, a product pump 154 such as a positive displacement supply pump may be provided in fluid communication with the product supply portion 30. When using a positive displacement supply pump, the product supply portion may include both at least one inlet 152 in fluid communication with the discharge portion 34, and at least one overflow outlet 44 in fluid communication with the discharge portion 34, so that any excess of product that is supplied through the at least one inlet 152 but which is not discharged through the discharge orifice 40 in discharge plate 41 can be removed from the spray nozzle body 20 via the overflow outlet 44. In such cases, the excess product can be recycled via line 156 to a product holding tank 158, or sent directly to the inlet product pump 154, or discharged to sewer 160 as appropriate under the circumstances. Alternately, a sight tube 170 (see FIGS. 3 and 4, for example) can be affixed to the product overflow arm 44. The sight tube 170 can be configured for visually monitoring the product feed rate to the spray nozzle assembly, so that the product feed rate can be adjusted to avoid loss of or the necessity to recycle any product.

In order to provide a desired spray pattern, the discharge orifice 40 may be provided in a suitably dimensioned frusto-conical passageway defined by interior edge walls in the discharge orifice plate 41. And, to seal or shut off the spray nozzle, it is convenient to provide a discharge nozzle 64 having a discharge nose end 66 with a frusto-conical shaped outer end surface, that is sized and shaped complementary to, for interior mating engagement with, the interior edge walls of in the passageway through the discharge orifice plate 41.

Generally, the use of threadless sanitary quick connect couplings are used to join the body 20 to adjacent components. More particularly, the couplings comprise quick disconnect ring clamps C of the type just described with respect to clamps 130 and 150, already discussed above.

Attention is now directed to FIGS. 10 through 16. The unique spray nozzles just described above are extremely useful in the application of a material to an endless sheet 200 in a thin film dryer 202. In such an application, an endless loop is used of a thin, infrared transparent material suitable for contact on a first side 204 with a selected product and on a second side 206 with a selected heat transfer fluid. The spray apparatus includes a spray sweep assembly 210. The sweep spray assembly has a structural base 212, one or more slide rails 214, and at least one slide block 216. At least one spray nozzle 230, is provided, and each one of the at least one spray nozzles 230 is affixed to one of the at least one slide block 216. The spray nozzles 230 are affixed within a working distance from the first side 204 of the thin film 200. Each one of the spray nozzles 230 is adapted to receive a product and to discharge the product as shown by reference arrows 232 toward the first side 204 of thin film 200. In one embodiment, each one of the spray nozzles 230 is provided with a nozzle of the type and configuration set forth herein above. However, the sweep spray assembly 210 may include alternate spray nozzle configurations. As depicted, two spray nozzles 230 are normally useful for a common width of thin films 204, however, the number of spray nozzles 230 may be varied as suitable in a given situation. As noted in FIG. 16, an adjustable sweep rate controller 240 may be provided, with sweep on-off switch 242, and with nozzle open-shut adjustable switch 244. The adjustable sweep rate controller 240 is adapted to control the rate at which said spray nozzles oscillate between the first side 250 and the second side 262 of their respective range of travel. As noted in FIGS. 11–15, two slide rails 214, and 2142 are provided, spaced apart by a mounting blocks $215_1$ and $215_2$. Also, two slide blocks, $216_1$ and $216_2$ are provided.

The sweep spray assembly 210, is used for application of a selected material to a thin film dryer 202. The thin film dryer 202 having an endless loop of thin, infrared transparent material suitable for contact on a first side 204 with a selected product and on a second side 206 with a selected heat transfer fluid. In practice, the thin film dryer having an endless loop of thin, infrared transparent material is provided. A sweep spray assembly 210 as just described above is provided. The sweep spray assembly has a structural base, one or more slide rails 216, at least one slide block 216, and an actuator 270 for moving the slide blocks 216 back and forth. The actuator 270 is an air or other fluid actuator. At least one spray nozzle 230 is provided, and each one of the at least one spray nozzles 230 is affixed to one of the at least one slide blocks 216. The spray nozzles 230 are located and affixed within a suitable working distance from the first side 204 of the thin film 200. A product is provided to each one of the at least one spray nozzles 230. The product is discharged from the spray nozzles on to the endless loop of thin, infrared transparent material 200. The sweep spray assembly is oscillated at a rate wherein the product is discharged relatively uniformly on to the first surface 204 of the thin, infrared transparent material 200. Then, the product just sprayed is introduced into the dryer 202 for drying to a suitable degree of residual moisture.

In yet another embodiment, a spray apparatus can be provided without a sweep spray assembly as just described herein above. In such a case, at least one spray nozzle is mounted on a spray mount 300, where the spray mount is a suitable structural base. Such a spray nozzle can, from a stationary position, apply a material to a thin film dryer, wherein the thin film dryer is as described above, in that it has an endless loop of thin, infrared transparent material suitable for contact on a first side with a selected product and on a second side with a selected heat transfer fluid. Each of the at least one spray nozzle is affixed within a working distance from the first side 204 of the thin film 200. Each of the at least one spray nozzle is adapted to receive a product and to discharge the product toward the thin film dryer. This unique combination includes at least one novel spray nozzle of the type described herein in combination with a thin film evaporator or dryer 202. In some embodiments two or more spray nozzles may be provided. And, where appropriate, in such a fixed spray nozzle arrangement, a sight tube 170 can be affixed to a product overflow arm, wherein the sight tube configured for monitoring, visually or otherwise, the product feed rate provided to the spray nozzle.

Although various aspects and elements of the invention are herein disclosed for illustrative purposes, it is to be understood that the spray nozzle and the method of use of the nozzle in thin film drying systems are important improvements in the state of the art of devices and methods for handling materials in thin film drying systems with cleanable, sanitary spray nozzle systems. Although only a few exemplary aspects have been described in detail, various details are sufficiently set forth in the figures of the drawing and in the specification provided herein to enable one of ordinary skill in the art to make and use the invention(s), which need not be further described by additional writing in this detailed description. Importantly, the aspects and embodiments described and claimed herein may be modified from those shown without materially departing from the novel teachings and advantages provided as described herein, and may be embodied in other specific forms without departing from the spirit or essential characteristics thereof. It is especially pointed out that the size, and shape of the spray nozzle, and resultant spray pattern, and the amount of material handled thereby, will vary widely based on the nature of products provided for spray, and based on the evaporation conditions used in a dryer or other equipment from which residual solvent (such as water) is removed. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s) is as described herein and as set forth in the appended claims, and as indicated by the drawing and by the foregoing description, is intended to include variations from the embodiments provided which are nevertheless described by the broad interpretation and range properly afforded to the plain meaning of the language of the claims set forth below.

The invention claimed is:

1. A cleanable spray nozzle, said spray nozzle comprising:

(a) a body, said body comprising (1) a hollow nozzie mounting chamber having an inner surface, said hollow nozzle mounting chamber having a nozzle mounting end and a product receiving end;

(2) a product supply portion, said product supply portion comprising an internal product passageway defined by interior walls, and (3) a discharge portion; said discharge portion having (A) discharge interior walls defining a product discharge passageway and (B) a discharge orifice;

(b) a spray nozzle assembly, said spray nozzle assembly removably mounted to said hollow nozzle mounting chamber with a quick disconnect clamp, said spray nozzle assembly comprising (1) a propellant supply tube, said propellant supply tube having an outer surface;

(2) a discharge end, said discharge end sized and shaped for discharge of a propellant fluid through said discharge nozzle;

(3) a first, outer seal, said first outer seal dimensioned relative to said inner surface of said nozzle mounting chamber so as to be engageable in a fluid tight manner with said inner surface;

(4) a second, inner seal, said inner seal dimensioned relative to said outer surface of said propellant supply tube so as to be slidably engageable in a fluid tight manner with said outer surface;

(5) a seal mount, said seal mount extending between said first, outer seal and said second, inner seal so as to effectively seal said nozzle mounting end of said hollow nozzle mounting chamber from said product receiving end of said hollow nozzle mounting chamber;

(c) an actuator, said actuator operatively connected to urge said discharge end of said spray nozzle to, and between, a first, end stop position wherein said discharge end is adjacent said discharge orifice, and a second, wide open position wherein said discharge end is spaced apart a preselected distance from said discharge orifice.

2. The apparatus as set forth in claim 1, wherein said interior walls of said product supply portion comprises smooth, cleanable surfaces.

3. The apparatus as set forth in claim 1, wherein said discharge product passageway comprises smooth, cleanable surfaces.

4. The apparatus as set forth in claim 1, wherein at least that portion of the inner surface of said hollow nozzle mounting chamber located to the product receiving end side of said first, outer seal comprises smooth, cleanable surfaces.

5. The apparatus as set forth in claim 1, wherein at least that portion of the inner surface of said hollow nozzle mounting chamber located in complementary engagement with said first, outer seal, comprises a smooth cleanable surface.

6. The apparatus as set forth in claim 1, wherein said hollow nozzle mounting chamber further comprises an inlet flange, and wherein said spray nozzle further comprises a mounting flange, and wherein said inlet flange and said mounting flange are configured for mating engagement therebetween.

7. The apparatus as set forth in claim 1, wherein said discharge end further comprises a discharge flange having a seal engaging ring, and wherein said discharge orifice plate comprises an interior face having a seal engaging ring, and wherein said discharge flange and said interior face of said discharge orifice plate are configured for mating engagement while incorporating a sanitary seal fitted therebetween.

8. The apparatus as set forth in claim 7, wherein said discharge orifice plate is detachably joined with said discharge flange with a quick disconnect clamp.

9. The apparatus as set forth in claim 1 wherein said hollow nozzle mounting chamber is cylindrical.

10. The apparatus as set forth in claim 9, wherein said seal mount is annular.

11. The apparatus as set forth in claim 1, wherein said actuator comprises a fluid actuated cylinder.

12. The apparatus as set forth in claim 11, wherein said propellant supply tube extends concentrically through said fluid actuated cylinder, and wherein said propellant supply tube is sized, shaped, and affixed to said hollow nozzle mounting chamber for movement relative to both said fluid actuated cylinder and to said hollow nozzle mounting chamber.

13. The apparatus as set forth in claim 1, wherein the distance between said discharge orifice and said discharge nozzle is selected for service with (a) a liquid, or (b) a slurry, (c) a pumpable high viscosity material, or (d) any substance or product material where particulates are included in (i) a liquid, (ii) a slurry, or (iii) a pumpable high viscosity material.

14. The apparatus as set forth in claim 1, wherein said product supply portion comprises at least one inlet in fluid communication with said discharge portion.

15. The apparatus as set forth in claim 1, further comprising a positive displacement supply pump in fluid communication with said product supply portion.

16. The apparatus as set forth in claim 15, wherein said product supply portion comprises (a) at least one inlet in fluid communication with said discharge portion, and (b) at least one overflow outlet in fluid communication with said discharge portion, so that any excess of product that is supplied through said at least one inlet but which is not discharged through said discharge orifice can be removed from said spray nozzle via said overflow outlet.

17. The apparatus as set forth in claim 15, wherein said body of said spray nozzle is shaped in a cross or "+" sign shape having four legs, and wherein one of said legs comprises one of said at least one inlet of said product supply portion, and wherein one of said legs comprises one of said at least one overflow outlets of said product supply portion.

18. The apparatus as set forth in claim 1, wherein said discharge orifice comprises a frusto-conical passageway defined by interior edge walls.

19. The apparatus as set forth in claim 18, wherein said nozzle comprises a frusto-conical shaped outer end surface, and wherein said outer end surface is sized and shaped complementary to, for interior mating engagement with, said interior edge walls of said passageway through said discharge orifice.

20. The apparatus as set forth in claim 1, or in claim 18, wherein threadless sanitary quick connect couplings are used to join said nozzle body to adjacent components.

21. The apparatus as set forth in claim 20, wherein said couplings comprise quick disconnect ring clamps.

22. The apparatus as set forth in claim 1, wherein said first, outer seal comprises an O-ring.

23. The apparatus as set forth in claim 1, or in claim 22 wherein said second, inner seal comprises an O-ring.

24. The apparatus as set forth in claim 1, wherein said hollow nozzle mounting chamber further comprises an inlet flange, and wherein said spray nozzle assembly further comprises a mounting flange, and wherein said inlet flange of said hollow nozzle mounting chamber and said mounting flange of said spray nozzle assembly are detachably affixed via a clamp.

25. The apparatus as set forth in claim 24, further comprising
(a) at least one retaining disc, said at least one retaining disc affixed to said seal mount to secure said first seal and said second seal against said interior surface of said hollow nozzle mounting chamber and against said propellant tube, respectively, and
(b) one or more interior structural spacers rods, said interior structural spacers having a mounting flange end and a seal end, said interior structural spacers secured to (1) said mounting flange, and (2) to a first one of said at least one retaining disc.

26. The apparatus as set forth in claim 25, further comprising at least two blocking or retaining discs, and wherein a first one of said at least one blocking disc is affixed to said interior structural spacers on the mounting end of said hollow nozzle mounting chamber, and wherein a second one of said at least one blocking discs is affixed to said seal mount.

27. The apparatus as set forth in claim 26, wherein said interior structural spacers comprise mounting rods.

28. The apparatus as set forth in claim 24, further comprising
(a) one or more exterior structural spacers, said exterior structural spacers having a body end and an actuator end, and (b) one or more mounting plates, at least one of said one or more mounting plates having a body side and an actuator side, and (c) wherein said exterior structural spacers are configured to space a first one of said one or more mounting plates a fixed distance from said mounting flange, while allowing translating motion of said propellant tube toward and away from said mounting flange, along a central axis with respect to said hollow nozzle mounting chamber.

29. The apparatus as set forth in claim 28, wherein said exterior structural spacers comprise structural rods.

30. The apparatus as set forth in claim 1, wherein said propellant comprises compressed air, and wherein said apparatus further comprises a compressed air supply operatively connected to said propellant supply tube.

31. The apparatus as set forth in claim 1, or in claim 11, or in claim 12, wherein said fluid actuated cylinder comprises a dual acting air actuated cylinder.

32. The apparatus as set forth in claim 1, wherein said product supply portion comprises at least one overflow outlet in fluid communication with said discharge portion, and wherein a sight tube is affixed to said at lease one overflow outlet, said sight tube configured for visually monitoring the product feed rate to said spray nozzle.

33. The apparatus as set forth in claim 1, wherein said product supply portion comprises at least one overflow outlet in fluid communication with said discharge portion, and wherein a sight tube is affixed to said at leant one overflow outlet, said sight tube configured for monitoring the product feed rate to said spray nozzle.

34. A spray apparatus for applying a material to a thin film dryer, said thin film dryer having an endless loop of thin, infrared transparent material suitable for contact on a first side with a selected product and on a second side with a selected heat transfer fluid, said spray apparatus comprising:

(a) a spray mount, said spray mount comprising a structural base, (b) at least one spray nozzle, each one of said at least one spray nozzle affixed to said spray mount, said at least one spray nozzle affixed within a working distance from said first side of said thin film, and wherein each of said at least one spray nozzle is adapted to receive a product and to discharge said product toward said thin film dryer, and (c) wherein each one of said at least one spray nozzle comprises a spray nozzle as set forth in claim 1.

35. The apparatus as set forth in claim 34, wherein two spray nozzles are provided.

36. The apparatus as set forth in claim 35, wherein a sight tube is affixed to said product overflow arm, said sight tube configured for monitoring the product feed rate to said spray nozzle.

* * * * *